UNITED STATES PATENT OFFICE.

MAX SICHEL, OF SAN FRANCISCO, CALIFORNIA.

METHOD OF PRODUCING DENTAL CEMENT.

SPECIFICATION forming part of Letters Patent No. 492,056, dated February 21, 1893.

Application filed May 17, 1892. Serial No. 433,362. (No specimens.)

*To all whom it may concern:*

Be it known that I, MAX SICHEL, a citizen of the United States, residing at the city and county of San Francisco, State of California, have invented a new and useful Improvement in the Method of Producing Dental Cement to be Applied to the Filling of Teeth; and I do hereby declare that the ingredients used and the manner of mixing or compounding them to make the said filling, together with the manner of applying the same, are fully set forth and described in the following specification.

My invention has for its object the production of a cement for the filling of teeth as a substitute for the usual ingredients now employed such as bone filling and the amalgams.

In carrying out my invention I take one pound of glacial phosphoric acid, put the same in a crucible and add to it ten ounces of distilled water and boil it down until a heat of from 210° to 220° Celsius is attained. When the above degree of heat has been attained I again add a sufficient quantity of distilled water to bring the product to the consistency of sirup. Then take the sirupy liquid so obtained and filter in a porcelain jar and add to it a sufficient quantity of metallic aluminum and let it stand twenty-four hours or so long as the phosphate compound will continue to dissolve or absorb the metallic aluminum, when I obtain what I denominate liquid phosphate of aluminum.

For the further carrying out of my invention I take a sufficient quantity of oxide of zinc and place it in a crucible and subject it to a white heat for the space of about six hours by which step the oxide of zinc is brought to a gummy condition. I then take equal parts of the liquid aluminum phosphate as above and the oxide of zinc so obtained and mix together to a hard or stiff consistency and submit it to a white heat in a crucible for the space of one hour. I then obtain what I denominate a phosphate of aluminum enamel. This enamel when cool is then pulverized to a fine powder when three parts of the powdered enamel is added back to one part of the gummy oxide of zinc obtained as above and mixed well together still retaining its powdered condition.

To prepare the filling I take according to the size of the cavity equal parts of the above powder and mix back again with the liquid phosphate of aluminum to bring it to a suitable plastic condition when it is introduced into the cavity of the tooth and in five minutes the substance will become sufficiently hardened and the tooth is finished, and the cement will not be affected by any of the secretions of the mouth.

Having thus described my invention, what I claim, and desire to secure by Letters Patent, is—

The herein-described method of producing a dental cement, the same consisting in first dissolving metallic aluminum in glacial phosphoric acid to produce a phosphate of aluminum, next subjecting the oxide of zinc to white heat to reduce it to a gummy condition, next mixing the two together and subjecting the compound to heat, next cooling and then pulverizing the compound, next adding more of the gummy oxide and mixing the whole in a powdered condition, and finally when ready for use adding sufficient of the said phosphate of aluminum to reduce the whole to a plastic condition, all as and for the purpose set forth.

In testimony that I claim the foregoing I have hereunto set my hand and seal.

MAX SICHEL. [L. S.]

Witnesses:
C. W. M. SMITH,
CHAS. E. KELLY.